April 26, 1966 H. C. DEUTSCHER 3,247,541

WINDSHIELD WIPER

Filed June 26, 1964

Inventor:
HANS C. DEUTSCHER
BY Dicke + Craig
ATTORNEYS

United States Patent Office 3,247,541
Patented Apr. 26, 1966

1

3,247,541
WINDSHIELD WIPER
Hans C. Deutscher, Ludwigsburg, Germany, assignor to SWF-Spezialfabrik für Autozubehor Gustav Rau G.m.b.H., Wuerttemberg, Germany
Filed June 26, 1964, Ser. No. 378,310
Claims priority, application Switzerland, Aug. 31, 1963, S 87,041
5 Claims. (Cl. 15—250.34)

The present invention relates to a windshield wiper, primarily for motor vehicles, and more particularly to a wiper arm unit which essentially consists of a head which is adapted to be secured to the reciprocating drive shaft, a wiper arm which is pivotably mounted on the head and carries the wiper blade, and a spring for pressing the wiper blade against the windshield when the wiper arm is in its operative position. One end of this spring is connected to the wiper arm and its other end is hooked upon a pin in the head of the wiper arm, and this head is fitted over a sleeve on the end of the drive shaft and is secured thereto by a locking member at least when the wiper arm is in its operative position.

The wiper arm units of the conventional type are usually provided with a thin leaf spring which is secured at one end within the head of the wiper arm and prevents this head, and thus the entire unit, from being unintentionally disconnected from the drive shaft when the wiper arm is pivoted away from the windshield to its inoperative position. The free end of this leaf spring is bent toward the drive shaft and it engages either behind a sleeve which is secured to the end of the drive shaft and upon which the head of the wiper arm is fitted by means of a socket-like aperture therein, or it engages into a recess or groove in the sleeve or in the drive shaft itself. In order to permit the wiper arm unit to be easily fitted on or removed from the drive shaft when the wiper arm is pivoted away from the windshield, the locking force of the leaf spring is usually very small and only sufficient to hold the wiper arm in this inoperative position on the drive shaft. The strength of this leaf spring is, however, hardly sufficient to hold the wiper arm securely on the shaft when it is in its operative position.

Whereas, according to the original construction of a wiper arm unit as above described, the other spring which produces the necessary wiping pressure of the wiper blade upon the windshield was hooked directly upon a pin which was secured within the head of the wiper arm. An improvement which was then introduced in order to overcome the above-mentioned deficiencies of this original construction consists in pivotably mounting a two-armed lever on this pin and in hooking the end of the spring into an eye in the end of one arm of this lever so that, when the wiper arm is in its operative position, the other arm of this lever presses against the leaf spring and thereby locks the same and prevents it from releasing the head of the wiper arm from the drive shaft.

There is another known construction of a wiper arm unit which is similar to the one mentioned above insofar as it is also provided with a two-armed lever. However, in this case the locking spring is omitted and, when the wiper arm is in its operative position, the second arm of the lever acts directly as a locking element by engaging behind the sleeve on the end of the drive shaft so as to lock the head of the wiper arm to this shaft. When the wiper arm is pivoted to its inoperative position away from the windshield, the two-armed lever is likewise pivoted and thereby disengaged from the drive shaft so

2 that the wiper arm unit is no longer secured thereto and may slide off the drive shaft. Obviously, a wiper arm unit of this design may only be employed in a vehicle in which the wiper arm is not merely required to be locked to its drive shaft in its operative position but also in its inoperative position.

It is an object of the present invention to provdie a wiper arm unit of the type as described above which is of a simpler construction and more reliable in operation and may be mass-produced at a lower expense than the known types of wiper arm units as mentioned above.

This object is attained according to the invention in principle by employing the coil spring which is required for producing the necessary wiping pressure of the wiper blade upon the windshield so as to accomplish not only this purpose but to serve also as a locking element for securing the wiper arm unit to its drive shaft.

The wiper arm unit according to the invention therefore carries out the same functions as one of the previous wiper arm units but at a saving of an element which heretofore was considered essential, namely the two-armed locking lever. Inasmuch as the presence of any additional movable element, such as this pivotable locking lever, involves an additional risk of operating trouble, for example, due to friction and wear, especially in a device such as a windshield wiper which should be extremely reliable in operation, even though it is made in mass production, it is evident that the omission of this locking lever not only reduces the cost of production, but also improves the reliability of operation of the wiper arm unit.

These advantages are attained according to the invention by the simple procedure of bending the tension coil spring which produces the necessary wiping pressure near one end thereof so as to form an eye portion which is rotatably mounted on the usual bearing pin which is secured within the head of the pivotable wiper arm, and by employing the free end of this coil spring which projects beyond this eye portion as a locking member to secure the wiper arm unit at least in its operative position to the reciprocating drive shaft.

According to one embodiment of the invention in which the head of the wiper arm is provided with a leaf spring the free end of which is adapted to engage behind a sleeve on the end having a drive shaft or into a groove in the drive shaft, the end of the coil spring which projects beyond the eye portion is bent so as to form a cam portion which, when the wiper arm is pivoted to its operative position presses upon the leaf spring near its locking end and thereby prevents this leaf spring from releasing the drive shaft. When the wiper arm is pivoted to its inoperative position, the cam portion on the end of the coil spring is likewise pivoted and thereby disengages from the leaf spring so that the wiper arm unit remains secured to the drive shaft merely by this relatively weak leaf spring, the locking force of which may be overcome by a strong pull on the head of the wiper arm away from the end of the drive shaft.

In the event that the wiper arm unit is not required to remain locked to the drive shaft in its inoperative position and the leaf spring is therefore omitted, the end of the coil spring which projects beyond the eye portion may be bent so as to engage behind the sleeve on the end of the drive shaft when the wiper arm is pivoted to the operative position and thus to lock the head of the wiper arm securely to the drive shaft. In this case, this end of the coil spring takes the place of the two-armed locking lever of the wiper arm construction of the second known type as previously described.

The features and advantages of the invention will become further apparent from the following detailed description of two preferred embodiments thereof which are illustrated in the accompanying drawings, in which—

FIGURE 2 shows a vertical section of the wiper arm unit according to FIGURE 1, but with the wiper arm being pivoted to its operative position; while

Figure 1:
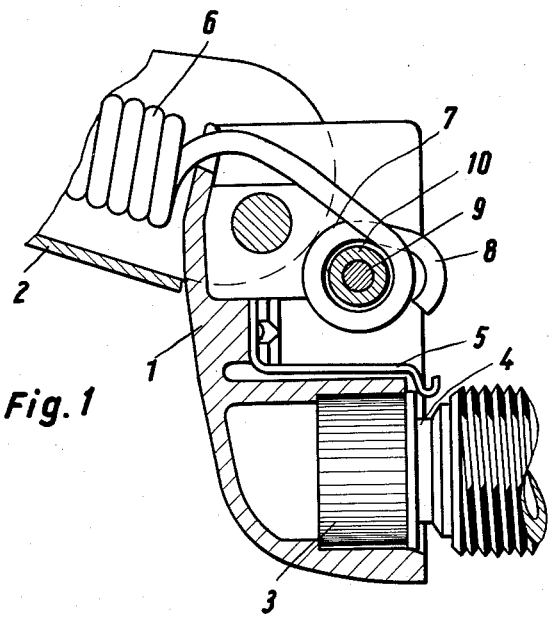
FIGURE 1 shows a vertical section of a wiper arm unit according to a first embodiment of the invention, in which the wiper arm which is only partly shown is pivoted to its inoperative position.
Figure 2:
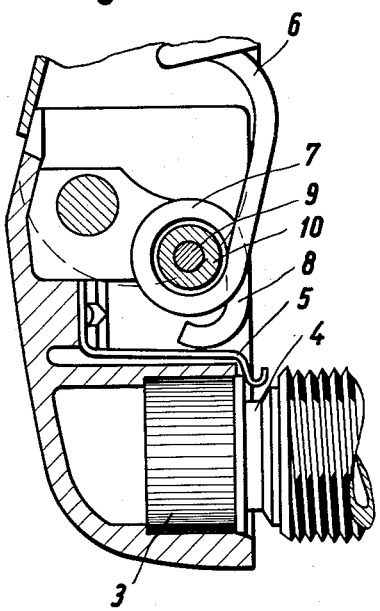

Referring first particularly to FIGURES 1 and 2 of the drawings, the wiper arm unit according to the invention essentially consists of a head 1, a wiper arm 2, which is pivotably connected to the head 1 and carries a wiper blade, not shown, and a tension coil spring 6 which maintains the wiper arm 2 in its operative and inoperative positions, as shown in FIGURES 2 and 1 respectively, and presses the wiper blade in the operative position with the necessary pressure against the windshield. The head 1 contains a socket which is fitted over a cylindrical sleeve 3 on the end of the reciprocating drive shaft 4 and is locked thereto by the engagement of the free end of a leaf spring 5 into a recess behind the sleeve 3. Since the leaf spring 5 has only a sufficient strength to prevent the head 1 from being unintentionally disconnected from the shaft 4 when the wiper arm 2 is tilted away from the windshield and thus in the inoperative position according to FIGURE 1, the end of the coil spring 6 which is wound around a sleeve 10 on a pin 9 within the head 1 and thus permits this spring to pivot about the axis of pin 9 is provided with a cam-shaped end portion 8 which, when the wiper arm 2 is in its operative position as shown in FIGURE 2 engages upon the leaf spring 5 and thereby prevents the free end thereof from becoming unlocked from the recess behind the sleeve 3 on shaft 4.

Figure 3:
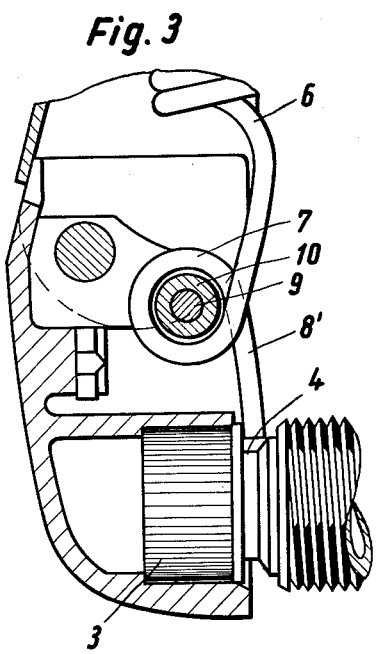
FIGURE 3 shows a vertical section of a wiper arm unit according to a second embodiment of the invention in which the end of the coil spring locks the head of the wiper arm directly to the drive shaft.

If it is not required that the head 1 of the wiper arm unit must remain safely attached to the drive shaft 4 so as to prevent its accidental removal therefrom when the wiper arm 2 is tilted to its inoperative position, leaf spring 5 may be omitted and, as shown in FIGURE 3, the end 8' of the coil spring 6 may be bent so as to engage directly into the recess behind the sleeve 3 on the drive shaft 4 and thus lock the wiper arm unit to the drive shaft when the wiper arm 2 is in its operative position.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A wiper arm unit for a windshield wiper comprising a head having a socketlike aperture adapted to be fitted over the end of a drive shaft, first and second pivot pins secured to said head, a wiper arm pivotably connected by said first pivot pin to said head for carrying a wiper blade, said wiper arm adapted to be pivoted from an operative position in which said wiper blade engages with a windshield to an inoperative position away from said windshield, a coil spring pivotable together with said wiper arm for maintaining said arm in said operative and inoperative positions and for biasing said wiper arm to press the wiper blade in said operative position against said windshield, said coil spring having one end secured to said wiper arm and being bent near the other end thereof at least once completely around an axis extending transversely to the longitudinal direction of said spring so as to form an eye portion and an end portion projecting beyond said eye portion, said eye portion being rotatably mounted on said second pivot pin, said end portion of said spring adapted to lock said head to said drive shaft at least when said wiper arm is in said operative position.

2. A wiper arm unit for a windshield wiper comprising a head having a socketlike aperture adapted to be fitted over the end of a drive shaft having a recess in the peripheral surface thereof, first and second pivot pins secured to said head, a wiper arm pivotably connected by said first pivot pin to said head for carrying a wiper blade, said wiper arm adapted to be pivoted from an operative position in which said wiper blade engages with a windshield to an inoperative position away from said windshield, a coil spring pivotable together with said wiper arm for maintaining said arm in said operative and inoperative positions and for biasing said wiper arm to press the wiper blade in said operative position against said windshield, said coil spring having one end secured to said wiper arm and being bent near the other end thereof at least once completely around an axis extending transversely to the longitudinal direction of said spring so as to form an eye portion and an end portion projecting beyond said eye portion, said eye portion rotatably mounted on said second pivot pin, and said end portion engaging into said recess in said shaft when said wiper arm is in said operative position so as to lock said head to said drive shaft, said end portion being pivoted out of said recess when said wiper arm is in said inoperative position so as to permit said wiper arm unit to be withdrawn from said shaft.

3. A wiper arm unit for a windshield wiper comprising a head having a socketlike aperture adapted to be fitted over the end of a drive shaft having a recess in the peripheral surface thereof, first and second pivot pins secured to said head, a wiper arm pivotably connected by said first pivot pin to said head for carrying a wiper blade, said wiper arm adapted to be pivoted from an operative position in which said wiper blade engages with a windshield to an inoperative position away from said windshield, a leaf spring mounted on said head and having one free end adapted to engage into said recess in said drive shaft so as to lock said wiper arm unit sufficiently to said drive shaft to prevent it from being unintentionally removed therefrom when said wiper arm is pivoted to said inoperative position, a coil spring pivotable together with said wiper arm for maintaining said arm in said operative and inoperative positions and for biasing said wiper arm to press the wiper blade in said operative position against said windshield, said coil spring having one end secured to said wiper arm and being bent near the other end thereof at least once completely around an axis extending transversely to the longitudinal direction of said spring so as to form an eye portion and an end portion projecting beyond said eye portion, said eye portion rotatably mounted on said second pivot pin, and said end portion being bent over so as to form a cam, said cam pressing upon said leaf spring near said free end thereof when said wiper arm and said coil spring are pivoted to said operative position so as to prevent the free end of said leaf spring from disengaging from said recess in said shaft and to lock said unit securely to said shaft.

4. A wiper arm unit for a windshield wiper arrangement for a windshield comprising:
  a drive shaft and a head member having a socket-like aperture engaging said drive shaft,
  a wiper arm pivotally connected to said head member for carrying a wiper blade, said wiper arm being pivotal from an operative position in which said wiper blade engages with a windshield to an inoperative position away from said windshield, and
  coil spring means for biasing said wiper arm to press the wiper blade against said windshield and simultaneously locking said head member on said drive shaft in said operative position, including, as an integral unit, a coil spring, having one end connected to said head member, and a projecting end portion of said coil spring.

5. A wiper arm unit for a windshield wiper arrangement for a windshield comprising:
- a drive shaft and a head member having a socket-like aperture engaging said drive shaft,
- a wiper arm pivotally connected to said head member for carrying a wiper blade, said wiper arm being pivotal from an operative position in which said wiper blade engages with a windshield to an inoperative position away from said windshield, and
- coil spring means for biasing said wiper arm to press the wiper blade against said windshield and simultaneously locking said head member on said drive shaft in said operative position, including, as an integral unit, a coil spring, having one end connected to said wiper arm and the other end pivotally connected to said head member, and a projecting end portion of said coil spring directly engaging said drive shaft in the operative position of said wiper arm.

References Cited by the Examiner

UNITED STATES PATENTS

| | | | |
|---|---|---|---|
| 2,365,251 | 12/1944 | Curtiss | 15—250.34 |
| 2,918,690 | 12/1959 | Krohm | 15—250.35 X |
| 3,011,200 | 12/1961 | Bignon | 15—250.34 |

CHARLES A. WILLMUTH, *Primary Examiner.*